Patented Feb. 16, 1937

2,070,609

UNITED STATES PATENT OFFICE 2,070,609

BUTADIENES AND CHLORINATED DERIVATIVES THEREOF

Irving Elkin Muskat, Chicago, Ill., assignor to E. I. du Pont de Nemours & Company, Wilmington, Del., a corporation of Delaware No Drawing. Application July 14, 1934, Serial No. 735,201

7 Claims. (Cl. 260—171)

This invention relates to the preparation of organic compounds and more particularly it relates to a new method for preparing diene hydrocarbons.

Butadiene-1,3 has been of interest in the past due to the possibility of its being used as a raw material for the production of synthetic rubber, and considerable research experimentation has been done relative to the preparation of this hydrocarbon. Caventou Ann., 127, 348 (1863), has obtained butadiene by passing the vapors of fusel oil through a hot tube, and since then it has been found in varying amounts in the pyrogenic decompositions of numerous organic compounds. Many potential methods for preparing butadiene depend upon the cracking of petroleum hydrocarbons. Yields of butadiene obtained by the methods referred to have invariably been low.

A method for the preparation of butadiene-1,3 distinct from previously known methods, has been suggested by Perkin J. Soc. Chem. Ind., 31, 618 (1912). This method depends upon the reaction of n-butyl alcohol with dry hydrogen chloride to form n-butyl chloride which is then reacted with chlorine to give a mixture of dichlorobutanes. The dichlorobutanes are passed over soda lime at elevated temperature, yielding up their chlorine content by scission of hydrogen chloride molecules, the final product being butadiene.

The present invention deals in particular with an improvement over Perkin's process of preparing butadiene-1,3. This application is a continuation-in-part of an application filed October 21, 1931, and given Serial No. 570,152 which has matured into Patent 2,038,593, April 28, 1936.

It is an object of this invention to prepare butadiene-1,3 and its homologues. A further object of the invention is to describe an improved method for preparing butadiene-1,3. Other objects will appear hereinafter.

In preparing butadiene-1,3 in accordance with the present invention, n-butyl alcohol was converted into n-butyl chloride according to the method of Norris, "Organic Syntheses" Vol. 5, p. 27 (1925), by heating the alcohol with concentrated hydrochloric acid and anhydrous zinc chloride. The pure chloride was then further chlorinated to the dichloride by reacting with chlorine. The chlorinated reaction mixture was then distilled through a fractionating column and the distillate collected in separate fractions. From the distillation temperature of the fractions collected it appears that the chlorinated product consisted of a mixture of some unreacted butyl chloride and the 1,2-, 1,3-, and 1,4-dichlorobutanes (possibly also some 1,1-dichlorobutane). Each of the fractions of the dichlorobutanes was distilled over coarse soda lime contained in an iron tube heated to a temperature of about 700–730° C. The volatile products coming from the tube were passed through several condensers and wash bottles and finally absorbed in chloroform or ligroin, the reaction product comprising butadiene-1,3 which was formed by removal of the chlorine content of the dichlorobutanes in the form of hydrogen chloride.

The following example illustrates our mode of preparting butadiene according to this invention:

Example 1

Two liters of n-butyl chloride, prepared from n-butyl alcohol according to the method of Norris (supra) were introduced into a 3 liter round-bottomed flask supported over an electric heating plate, the flask being provided with a thermometer adapted to be partially immersed in the liquid. The flask was provided with a vertical glass vapor tube surmounted by a reflux condenser, the vapor tube and reflux condenser comprising a continuous passage for the vapors generated by the butyl chloride contained in the round-bottomed flask. The vapor tube was provided with a passage for introducing chlorine into the vapor space, and was subjected to light emitted from a 1000 watt lamp placed in close proximity to the vapor tube. The butyl chloride was heated to boiling and when the butyl chloride vapors filled the vapor tube, chlorine was passed into the vapor tube, and the 1000 watt lamp turned on. The chlorine was passed in at a rate of about 1120 cc. per minute. At the beginning of the chlorination the temperature was 77° C., the boiling point of butyl chloride. As the distillation proceeded the temperature of the liquid rose, and the chlorination was allowed to proceed until the temperature reached 115° C. This required about 6 hours. If the temperature had been allowed to go much higher than 115° C. some more highly chlorinated products would have been formed.

After the reaction was completed, the chlorinated mixture was roughly fractionated through a column one meter long filled with glass beads. The results of 4 runs carried on under the conditions described above are recorded in Table I.

TABLE I

*Chlorination experiments on butyl chloride*

| Run No. | 1 | 2 | 3 | 4 | 5 | 6 | Residue |
|---|---|---|---|---|---|---|---|
| | 77–110° | 110–120° | 120–130° | 130–140° | 140–150° | 150–160° | |
| | Grams | Grams | Grams | Grams | Grams | Grams | Grams |
| 1 | 242 | 330 | 503 | 546 | 166 | 132 | 100 |
| 2 | 382 | 300 | 472 | 552 | 191 | 127 | 114 |
| 3 | 392 | 252 | 418 | 516 | 169 | 138 | 100 |
| 4 | 292 | 345 | 500 | 540 | 207 | 122 | 107 |

Fraction 1 contained mostly unreacted butyl chloride. Fraction 2 probably contained dichloro-1,1-butanes. Fraction 3 contained most of the dichloro-1,2-butane. Fraction 4 contained most of the dichloro-1,3-butane. Fraction 6 contained most of the dichloro-1,4-butane, and fraction 5 was probably a mixture of fractions 4 and 6.

The different fractions of dichlorobutane were now separately distilled over heated soda lime. The dichlorobutane fractions were passed in the form of vapors into a steel tube containing 450 g. of coarse soda lime, the tube being heated to about 700–730° C. by means of an electric furnace. The vapors passing out of the tube traveled in succession through cooling vessels to remove water, unreacted dichlorobutane and tarry and resinous products from the reacted mixture, the resulting vapors being substantially pure butadiene. A number of runs under the conditions enumerated above were made with the different fractions of dichlorobutane to determine the yield of butadiene-1,3 obtained in each of the fractions. The butadiene formed was collected as the tetrabromide by bubbling the formed butadiene vapors through chloroform containing an excess of bromine. Complete bromination of the butadiene-1,3 caused the formation of two stereo-isomeric tetrabromobutanes, one liquid and one solid and crystalline. The percentage yields of butadiene from the dichlorobutanes are calculated from the amount of tetrabromide obtained. The yields of butadiene-1,3 obtained from 200 g. of each of the chlorinated fractions of Table I are listed in Table II, each run being about one hour in duration:

TABLE II

*Percentage of butadiene obtained from each of the chlorinated fractions*

| | 1 | 2 | 3 | 4 | 5 | 6 |
|---|---|---|---|---|---|---|
| | 75–110° | 110–120° | 120–130° | 130–140° | 140–150° | 150–165° |
| Butadiene tetrabromide Obtained | Grams 40 41 | Grams 118 104 | Grams 148 144 | Grams 174 174 | Grams 139 ------ | Grams 146 157 |
| Yield of butadiene | Percent 6.9 | Percent 18.8 | Percent 24.8 | Percent 29.6 | Percent 23.6 | Percent 25.6 |

From the data given in Table II it is noted that the dichloro-1,3-butane fraction gave the best yield of butadiene, 29.6% of the theoretical.

While the above description of the invention is very specific it will be understood that the invention is not to be limited to the exact conditions of the example. The soda lime used in the above example to remove hydrogen chloride from the dichlorobutanes may be replaced by any agent which will split off hydrogen chloride from the dichlorobutanes to form butadiene. This agent will preferably be alkaline in nature. Examples of such compounds are soda lime, sodium hydroxide, potassium hydroxide, potassium carbonate, etc. The temperature may, likewise, be varied from that given in the example. It is necessary that the temperature be elevated and it is preferable that it be in the neighborhood of 730° C. Some variation from this latter range is, however, permissible.

A preferred method for carrying out the process of the present invention involves flash distillation. Good yields of butadiene are obtained by flash distilling the various dichlorobutanes in contact with soda lime.

The butadiene produced by the process of this reaction is useful as a starting material in the synthesis of a wide variety of both old and new compounds. It has been found particularly advantageous in the production of chlorine substituted hydrocarbons.

The process of the present invention has various distinct advantages over the process previously described for the production of butadiene. Among these may be mentioned the fact that a pure product is obtained more readily and in much larger yield.

It is apparent that many widely different embodiments of this invention may be made without departing from the spirit and scope thereof and, therefore, it is not to be limited except as indicated in the appended claims.

I claim:

1. A process for preparing butadiene which comprises reacting n-butyl chloride with chlorine, separating from the reaction mixture fractions, each of which contains an isomeric dichlorobutane, then passing separate fractions, at a temperature of about 700 to 730° C. over an alkaline agent which will split off hydrogen chloride from the dichlorobutane to form butadiene.

2. In the process of preparing butadiene, the step which comprises passing a dichlorobutane of the group consisting of 1,2-dichlorobutane, 1,3-dichlorobutane and 1,4-dichlorobutane over an alkaline agent which will split off hydrogen chloride from the dichlorobutane to form butadiene, at a temperature of about 700 to 730° C.

3. The process of claim 2 in which the agent is soda lime.

4. In the process of preparing butadiene, the step which comprises contacting 1,3-dichlorobutane at a temperature of about 700 to 730° C. with an alkaline agent which will split off hydrogen chloride from the dichlorobutane to form butadiene.

5. The process of claim 4 in which the agent is soda lime.

6. The process of claim 4 in which the dichlorobutane is flash distilled in contact with the alkaline agent.

7. The process of claim 1 in which the agent is soda lime.

IRVING E. MUSKAT.